United States Patent
Kimme et al.

(10) Patent No.: US 10,564,470 B2
(45) Date of Patent: Feb. 18, 2020

(54) BACKLIGHTING DEVICE

(71) Applicant: OSRAM OPTO Semiconductors GmbH, Regensburg (DE)

(72) Inventors: Felix Kimme, Stephanskirchen (DE); Christopher Koelper, Regensburg (DE); Peter Brick, Regensburg (DE)

(73) Assignee: OSRAM OPTO Semiconductors GmbH, Regensburg (DE)

( * ) Notice: Subject to any disclaimer, the term of this patent is extended or adjusted under 35 U.S.C. 154(b) by 144 days.

(21) Appl. No.: 15/325,450

(22) PCT Filed: May 29, 2015

(86) PCT No.: PCT/EP2015/061980
§ 371 (c)(1),
(2) Date: Jan. 11, 2017

(87) PCT Pub. No.: WO2016/005102
PCT Pub. Date: Jan. 14, 2016

(65) Prior Publication Data
US 2017/0160590 A1    Jun. 8, 2017

(30) Foreign Application Priority Data

Jul. 11, 2014   (DE) .......... 10 2014 213 549

(51) Int. Cl.
*G02F 1/1335* (2006.01)
*G02B 5/12* (2006.01)
(Continued)

(52) U.S. Cl.
CPC ......... *G02F 1/133605* (2013.01); *G02B 5/12* (2013.01); *G02B 5/124* (2013.01);
(Continued)

(58) Field of Classification Search
CPC ......... G02F 1/133605; G02F 1/133603; G02F 1/133608; G02F 1/133611; G02B 5/12;
(Continued)

(56) References Cited

U.S. PATENT DOCUMENTS

| 2007/0047225 A1 | 3/2007 | Sudo |
| 2007/0209244 A1 | 9/2007 | Prollius et al. |

(Continued)

FOREIGN PATENT DOCUMENTS

| CN | 101023379 A | 8/2007 |
| CN | 101137706 A | 3/2008 |

(Continued)

OTHER PUBLICATIONS

German Search Report based on application No. 10 2014 213 549.4 (7 pages) dated Apr. 7, 2015 (Reference Purpose Only).
(Continued)

*Primary Examiner* — Anh T Mai
*Assistant Examiner* — Hana S Featherly
(74) *Attorney, Agent, or Firm* — Viering, Jentschura & Parnter MBB

(57) ABSTRACT

In various embodiments, a backlighting device is provided. The backlighting device may include a plurality of semiconductor light sources arranged in a plane and serving for generating light radiation, and a side wall arranged laterally with respect to the semiconductor light sources, where the side wall is inclined with respect to the plane predefined by the semiconductor light sources, and wherein the side wall is retroreflective at a side which can be irradiated with light radiation of the semiconductor light sources.

20 Claims, 5 Drawing Sheets

(51) Int. Cl.
  *G02B 5/124* (2006.01)
  *G02B 5/128* (2006.01)
  *G02B 5/13* (2006.01)

(52) U.S. Cl.
  CPC ............... *G02B 5/128* (2013.01); *G02B 5/13* (2013.01); *G02F 1/133603* (2013.01); *G02F 1/133608* (2013.01); *G02F 1/133611* (2013.01)

(58) Field of Classification Search
  CPC .......... G02B 5/124; G02B 5/128; G02B 5/13; G02B 6/0055
  USPC ....................................................... 362/97.1
  See application file for complete search history.

(56) References Cited

U.S. PATENT DOCUMENTS

| | | |
|---|---|---|
| 2008/0198621 A1 | 8/2008 | Tanoue et al. |
| 2010/0149456 A1 | 6/2010 | Fujiwara et al. |
| 2011/0122494 A1 | 5/2011 | Sherman et al. |
| 2011/0182076 A1 | 7/2011 | Sherman et al. |
| 2012/0069248 A1* | 3/2012 | Yokota .............. G02F 1/133605 348/739 |
| 2012/0228659 A1 | 9/2012 | Hsu et al. |
| 2014/0104816 A1 | 4/2014 | Takasi et al. |

FOREIGN PATENT DOCUMENTS

| | | |
|---|---|---|
| CN | 201680215 U | 12/2010 |
| CN | 102449376 A | 5/2012 |
| DE | 102006037791 A1 | 3/2007 |
| EP | 2426395 A1 | 3/2012 |
| JP | 2002162912 A | 6/2002 |
| JP | 2009150956 A | 7/2009 |
| TW | 200600383 A | 1/2006 |
| TW | 201007086 A | 2/2010 |
| TW | 201007647 A | 2/2010 |
| TW | 201238105 A | 9/2012 |
| WO | 2006099375 A1 | 9/2006 |

OTHER PUBLICATIONS

International Search Report based on application No. PCT/EP2015/061980 (3 pages and 2 pages of English translation) dated Sep. 1, 2015 (Reference Purpose Only).

Chinese Office Action including Search Report issued for Chinese counterpart application 201580037930, dated Dec. 3, 2018, 7 pages (for reference purpose only).

Taiwanese Office Action, including a Search Report, for corresponding Taiwanese Patent Application 104120233, dated Jan. 26, 2016 (3 pages) (for reference purpose only).

* cited by examiner

BACKLIGHTING DEVICE

RELATED APPLICATIONS

The present application is a national stage entry according to 35 U.S.C. § 371 of PCT application No.: PCT/EP2015/061980 filed on May 29, 2015, which claims priority from German application No.: 10 2014 213 549.4 filed on Jul. 11, 2014, and is incorporated herein by reference in its entirety.

TECHNICAL FIELD

Various embodiments relate generally to a backlighting device including a plurality of semiconductor light sources for generating light radiation and a side wall arranged laterally with respect to the semiconductor light sources. Various embodiments furthermore relate to an apparatus including such a backlighting device.

BACKGROUND

A backlighting device (backlight) serves for homogeneously illuminating a surface. One example is the illumination of a rear side or rear surface of a liquid crystal display (LCD). In a configuration designated as LED backlight, light emitting diodes (LEDs) are used for generating light radiation. A customary arrangement is the so-called direct backlight. In this case, LED light sources each having a primary optical unit are situated in a plane parallel to the surface to be illuminated. The primary optical units serve to provide an emission characteristic with a light emission taking place toward the side. This serves to obtain a homogeneous irradiation of the surface to be illuminated by means of a superimposition of the light proportions of neighboring light sources.

At the edge of the backlighting device it is necessary to enable, by means of a reflection of radiation, a superimposition of light radiation such that the surface to be illuminated experiences a homogeneous irradiation at this point, too. The reflection of radiation can take place at side walls of a wall structure extending around the light sources in a frame-shaped fashion.

One possibility is an orthogonal orientation of the side walls of the frame in relation to a plane predefined by the light sources, and a configuration of the side walls as a specular reflector. Light of a marginal light source can thereby be reflected in each case as if this proportion came from a further fictitious light source situated outside the backlighting device.

The concept mentioned above is simple, but not always desirable. In this regard, instead of a perpendicular orientation, an angled orientation of the side walls is required, rather, in order to obtain a flat appearance. This concerns the field of flat screens, for example.

A configuration with inclined and specularly reflective side walls leads to an increased luminance and hence a bright edge at the surface to be illuminated, such that homogeneous illumination is no longer possible. Conventionally, the surface of the oblique side walls is therefore made diffusively reflective. This is associated with a Lambertian emission characteristic, as a result of which part of the light impinging on the side walls can be reflected back again in the direction of the light sources.

The greater the intended distance between the light sources and the smaller the intended distance between the light sources and the surface to be illuminated, the more difficult it is, however, to obtain a homogeneous illumination with the aid of diffuse reflection. With the large distance between the light sources and a small distance between the light sources and the surface to be illuminated, the proportion of light reflected back is insufficient, with the consequence that an increased luminance occurs at the edge.

SUMMARY

In accordance with various embodiments, a backlighting device is proposed. The backlighting device includes a plurality of semiconductor light sources arranged in a plane and serving for generating light radiation, and a side wall arranged laterally with respect to the semiconductor light sources. The side wall is inclined with respect to the plane predefined by the semiconductor light sources. Furthermore, the side wall is retroreflective at a side which can be irradiated with light radiation of the semiconductor light sources.

With the aid of the backlighting device, a surface to be illuminated, also designated hereinafter as illumination surface, can be irradiated with light radiation of the semiconductor light sources. In this case, the semiconductor light sources arranged in a plane can be situated parallel to the illumination surface.

The side wall of the backlighting device is inclined with respect to the plane predefined by the semiconductor light sources and thus also with respect to the associated normal to the plane. In the same way, the side wall can be inclined with respect to the illumination surface. In this case, the side wall can run obliquely outward in the direction of the illumination surface. The oblique configuration allows a flat appearance of the backlighting device. This correspondingly holds true for an apparatus equipped with the backlighting device.

The inclined side wall of the backlighting device is retroreflective. The retroreflective configuration is present at a side of the side wall which can be irradiated with light radiation of the semiconductor light sources. As a result, it is possible, during the operation of the backlighting device, to reflect back at the side wall a large part of an incident light radiation in the direction of the incident radiation or away from a normal predefined by the side wall in the direction of the incident radiation. This also applies to light radiation which is emitted by light sources adjacent to the side wall in the direction of the side wall. In this way, it is possible to avoid the occurrence of an increased luminance at the edge of the illumination surface in the region of the side wall. With the aid of the backlighting device, therefore, it is possible to obtain a homogeneous irradiation of the illumination surface, including at the edge in the region of the side wall.

This advantage can be manifested all the more distinctly, the smaller the number of semiconductor light sources or the greater the distance thereof among one another and/or the smaller the distance between the light sources and the illumination surface. In other words, the retroreflective configuration of the oblique side wall affords the possibility of realizing the backlighting device with a small number of semiconductor light sources and a small height or structural depth.

The retroreflective configuration of the side wall means that the side wall is designed in a targeted manner for bringing about a retroreflection. In this case, the part of an incident light radiation which is reflected back or retroreflected at the side wall is greater or significantly greater than is the case with a conventional, diffusively reflective side wall. This can be realized by means of a configuration of the side wall with a retroreflective structure. Possible embodiments in this respect will be discussed in even greater detail further below.

Ideal or complete retroreflection does not exist in reality. Therefore, part of the incident light radiation can additionally be diffusively reflected at the retroreflective side wall. In this way, during the operation of the backlighting device, a proportion of light can also be emitted from the side wall in the direction of the edge of the illumination surface, which contributes to the homogeneous irradiation of the illumination surface at the edge.

The diffuse reflection of radiation which is desirable and occurs at the retroreflective or partly retroreflective side wall can be caused by effects such as, for example, scattering effects, a reflection at an (at least one) interface, structure defects, etc.

Further possible details and embodiments of the backlighting device are described in greater detail below.

The semiconductor light sources of the backlighting device may include light emitting diodes (LEDs) for example. Furthermore, the semiconductor light sources can be designed for example for generating white light radiation. This can be effected by means of a radiation conversion using one or a plurality of conversion materials or phosphors.

By way of example, the semiconductor light sources realized in the form of light emitting diodes may include light emitting diode chips for generating a blue primary radiation and conversion elements assigned to the light emitting diode chips. The conversion elements can be designed to convert part of the blue light radiation into one or more secondary radiations in the green to red spectral range. A white mixed radiation can be generated in this way.

The semiconductor light sources can furthermore have suitable optical units or primary optical units. The latter can be designed in such a way that the semiconductor light sources have a spread emission characteristic with a light emission taking place toward the side. By way of example, the primary optical units can be realized in the form of lenses. In this way, a homogeneous irradiation of the illumination surface can be obtained by means of a superimposition or mixing of the radiation portions of the semiconductor light sources.

The semiconductor light sources arranged in a plane can be positioned in the form of a regular grid or in a matrix-shaped fashion in the form of rows and columns.

Regions between the semiconductor light sources and also, if appropriate, at the edge or adjoining the retroreflective side wall can be designed to be diffusively reflective. The homogeneous irradiation of the illumination surface can be fostered thereby.

With regard to the inclination of the side wall, an inclination angle with respect to the normal to the plane predefined by the semiconductor light sources of 45° or more, or in a range of between 45° and 80°, for example, can be present, for example. An inclination angle in a range of between 60° and 70° is conceivable, for example. A flat appearance of the backlighting device can be fostered thereby. However, a smaller inclination angle of less than 45° is also possible.

In a further embodiment, the inclined and retroreflective side wall is part of a frame extending around the semiconductor light sources. The frame has further side walls.

In a further embodiment, the frame is rectangular or has a rectangular contour in plan view. In this configuration, the frame thus has three further side walls.

In a further embodiment, at least one of the further side walls of the frame is likewise inclined and retroreflective. The features and details described above and also below can be correspondingly applied to this side wall. The inclined configuration allows a flat appearance. The retroreflective configuration makes it possible to avoid the occurrence of an increased luminance at the edge of the illumination surface in the region of the side wall.

With regard to a rectangular configuration of the frame, the backlighting device may include two mutually opposite side walls, for example, which are inclined and retroreflective. Such a configuration in which all four side walls are inclined and retroreflective is also possible.

Furthermore, it is possible for at least one side wall of the for example rectangular frame not to be inclined, but instead to be oriented perpendicular to the plane predefined by the semiconductor light sources or perpendicular to the illumination surface. Such an orthogonal side wall can be designed to be specularly reflective at the side which can be irradiated with light radiation of the semiconductor light sources, in order to enable a homogeneous illumination.

As was described above, the retroreflective configuration of the (at least one) side wall of the backlighting device makes it possible to reflect back a relatively large part of an incident light radiation in the direction of the incident radiation or away from a normal predefined by the side wall in the direction of the incident radiation. In this context, the following embodiments can be taken into consideration, these embodiments making it possible to provide a homogeneous illumination with a high reliability.

In a further embodiment realized in this sense, the (at least one) retroreflective side wall is designed to reflect back more than 50% of an incident light radiation in an angle range beginning from an angle of more than 0° relative to a normal predefined by the side wall, that is to say away from the normal in the direction of the incident light radiation. The side wall can furthermore be designed to the effect that more than 70% or more than 90% of the incident light radiation is reflected back in the manner mentioned above. This fosters the provision of a homogeneous illumination.

In a further embodiment, the (at least one) retroreflective side wall is designed to reflect back more than 50% of an incident light radiation in a predefined angle range in the direction of the incident light radiation, in particular in an angle range of −45° to 45° or of −30° to 30° relative to an angle of incidence of the incident light radiation. The side wall can be designed here, too, to the effect that more than 70% or more than 90% of the incident light radiation is reflected back in the manner described above. The homogeneous illumination can likewise be fostered thereby.

In the case of the embodiments described above, the incident light radiation or a significant part of the incident light radiation can impinge on the side wall with an angle of incidence which is in a range of between 20° and 70°, for example, relative to the normal predefined by the side wall. In this case, the angle of incidence depends on the inclination of the side wall, inter alia.

The above-explained configurations or indications concerning retroreflection can relate to the reflection of radiation that occurs in the cross section of the side wall. In a spatial direction perpendicular thereto, the side wall may or may not be retroreflective. Furthermore, it is pointed out that in the case of a configuration of the backlighting device with a plurality of retroreflective side walls, all of the retroreflective side walls can be designed as indicated above. This can also apply to the embodiments specified below.

The retroreflective property of the (at least one) side wall of the backlighting device can be realized by virtue of the fact that the side wall has a retroreflective structure. Various configurations can be taken into consideration for this purpose.

A retroreflection can be realized by a combination of a lens and a convexly curved reflective surface, wherein these components are coordinated with one another in such a way that a light radiation focused with the aid of the lens impinges on the curved reflective surface substantially perpendicularly. In this case, the light radiation reflected at the curved surface can return substantially in the direction of the incident light radiation. A retroreflective structure can therefore be realized with structure elements which each include a lens and an associated curved reflective surface.

One possible configuration of a retroreflective structure which functions according to this principle has an arrangement of microspheres. The microspheres can be formed from a transparent material and be positioned alongside one another. Here a front-side part of the spherical surface of the microspheres can serve in each case as a lens in order to focus light radiation in the direction of a rear-side part of the spherical surface. The microspheres can be embedded on the front side into a layer composed of a transparent material having a lower refractive index in comparison with the microspheres. Said layer can be realized as a planarization layer. In order to bring about a reflection of radiation at the rear-side spherical surface of the microspheres, the rear-side spherical surface of the microspheres can be designed to be reflective. For this purpose, for example, a reflective metallic material or a Bragg mirror can be arranged at the rear side of the microspheres.

Furthermore, the retroreflective structure can have a microlens arrangement. This can be realized with the aid of a layer composed of a transparent material, said layer including curved partial surfaces at a front side and at a rear side. In this case, the front-side curved partial surfaces can serve in each case as lenses or microlenses in order to focus light radiation in the direction of the rear-side curved partial surfaces. A further layer composed of a transparent material can be arranged on the front side of the transparent layer having the curved partial surfaces, which further layer can be realized as a planarization layer. In order to bring about a reflection of radiation at the rear-side curved partial surfaces of the transparent layer, said partial surfaces can be designed to be reflective. For this purpose, for example, a reflective metallic material or a Bragg mirror can be arranged at the rear side of the transparent layer.

The transparent layer can have a biconvex configuration. In this case, the front-side and the rear-side curved partial surfaces of the transparent layer are each curved outward. A configuration in the form of meniscus lenses is also possible. In this case, the front-side curved partial surfaces are curved inward, and the rear-side curved surfaces outward.

A further example is a retroreflective structure having an arrangement of corner or angle reflectors arranged alongside one another. Such structure elements can have two or three reflection surfaces oriented perpendicularly to one another. This can be realized for example with the aid of a layer or carrier layer which has a structured side with cutouts in the form of the corner reflectors and is reflective at this side. The layer can be formed from a reflective metallic material or have, at the structured side, a reflective coating, for example a metallic coating or a coating in the form of a Bragg mirror.

Furthermore, a layer composed of a transparent material, which layer can be realized as a planarization layer, can be arranged on the structured side of the layer. In this way, the cutouts can be filled with the transparent material. The filled cutouts or corner reflectors can form a microprism arrangement.

Apart from these configurations, further configurations for a retroreflective structure can be taken into consideration. By way of example, it is possible to provide an arrangement of cones or truncated cones that are inverted, i.e. upside down in relation to the incident light radiation. The (truncated) cones can have a reflective surface or lateral surface and an opening angle of 90°, as a result of which they can act in a comparable manner to corner reflectors. For the configuration with (truncated) cones, the details mentioned above with regard to the corner reflectors can be applied analogously.

In this sense it is possible to realize the retroreflective structure with the aid of a layer or carrier layer which has a structured side having cutouts in the form of (truncated) cones and is reflective at this side. The layer can be formed from a reflective metallic material or have, at the structured side, a reflective coating, for example a metallic coating or a coating in the form of a Bragg mirror. A layer composed of a transparent material, which layer can be realized as a planarization layer, can furthermore be arranged on this side of the layer. In this case, the cutouts can be filled with the transparent material.

A retroreflective structure has an acceptance angle for the incident light radiation for which the structure is retroreflective. The inclined orientation of the (at least one) side wall of the backlighting device can have the consequence that a light radiation coming from the semiconductor light sources impinges substantially obliquely on the side wall and thus on the associated retroreflective structure. In order to avoid an impairment or reduction of the retroreflective effect that is possibly associated therewith, a further embodiment provides for structure elements of the retroreflective structure of the side wall to be tilted with respect to a normal predefined by the side wall. In this case, the structure elements can be designed to be tilted in the direction of the incident light radiation. What can be achieved in this way is that a large part of the incident light radiation is reflected back in the direction of the incident radiation with a high reliability. The tilted configuration can be taken into consideration for example for structure elements such as the above-described corner reflectors or microprisms, but also the (truncated) cones.

A retroreflective structure used in the backlighting device can be realized for example in the form of or on a retroreflective film. In this case, the (at least one) side wall of the backlighting device may include such a film. The film can be an adhesive film, for example.

With regard to the above-described diffuse reflection that occurs in addition to the retroreflection, it is conceivable, if appropriate, to design the (at least one) retroreflective side wall in a targeted manner to bring about the diffuse reflection. As a result, for example, the intensity of the diffuse reflection occurring at the side wall can be precisely predefined or a greater proportion of light diffusively reflected can be made available. This can be done for example by designing the side wall with a roughened surface. With the use of a front-side layer or planarization layer composed of a transparent material, as was described above, the roughened surface can be provided at said layer. An alternative variant is a configuration of the side wall with scattering particles. With the use of a front-side layer or planarization layer, such particles can be embedded for example in the transparent material of the layer.

Further details and configurations can be taken into consideration for the backlighting device. By way of example, a configuration with a frame composed of a plurality of side walls is possible, wherein the frame has a different contour instead of a rectangular contour in plan view, for example a triangular contour having three side walls. In this case, at least one side wall is designed such that it is inclined and retroreflective. A perpendicular side wall (if present) can be designed to be specularly reflective.

Furthermore, the or an inclined and retroreflective side wall of the backlighting device can have a straight contour or else a curved contour in plan view. An inclined and retroreflective side wall arranged laterally with respect to the light sources can furthermore have for example a circular or oval contour that is closed in plan view and extends around the light sources.

In accordance with various embodiments, an apparatus is proposed which includes a backlighting device having the construction described above or having a construction in accordance with one or more of the embodiments described above. Furthermore, the apparatus includes a further device, which can be irradiated with light radiation of the backlighting device.

With the aid of the backlighting device, the further device can be illuminated homogeneously with light radiation of the semiconductor light sources at a rear side or rear surface. As a result of the inclined orientation of the side wall, the backlighting device and thus the apparatus can have a flat appearance. The retroreflective embodiment of the inclined side wall furthermore makes it possible to prevent the occurrence of an increased luminance at the edge of the illuminated rear side of the further device. In this way, the further device can be illuminated as homogeneously as possible from the rear, including at the edge or in the region of the side wall.

Various configurations can be taken into consideration for the apparatus and the further device to be irradiated. The apparatus can be for example a flat screen or a flat screen television. In this case, the further device can be a liquid crystal screen or a liquid crystal display (LCD).

Alternatively, the apparatus can also be, for example, a self-luminous road sign, an advertisement, a self-luminous poster or a surface light source for room lighting. The further device irradiated from the rear may include in this case for example components such as a transparent layer, possibly colored differently in different regions, a diffuser plate, etc.

It is pointed out that aspects and details mentioned above with regard to the backlighting device can also be applied to the apparatus.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Possible configurations of a backlighting device 105 are described on the basis of the following schematic figures. The backlighting device 105 is part of an apparatus 100 and is used for illuminating a further device 135 of the apparatus 100 on the rear side. It is pointed out that the figures are merely of schematic nature and are not true to scale. In this sense, components and structures shown in the figures may be illustrated with exaggerated size or size reduction in order to afford a better understanding. In the same way, it is possible that the backlighting device 105 and the apparatus 100 may have further components and structures in addition to components and structures shown and described.

Figure 1:
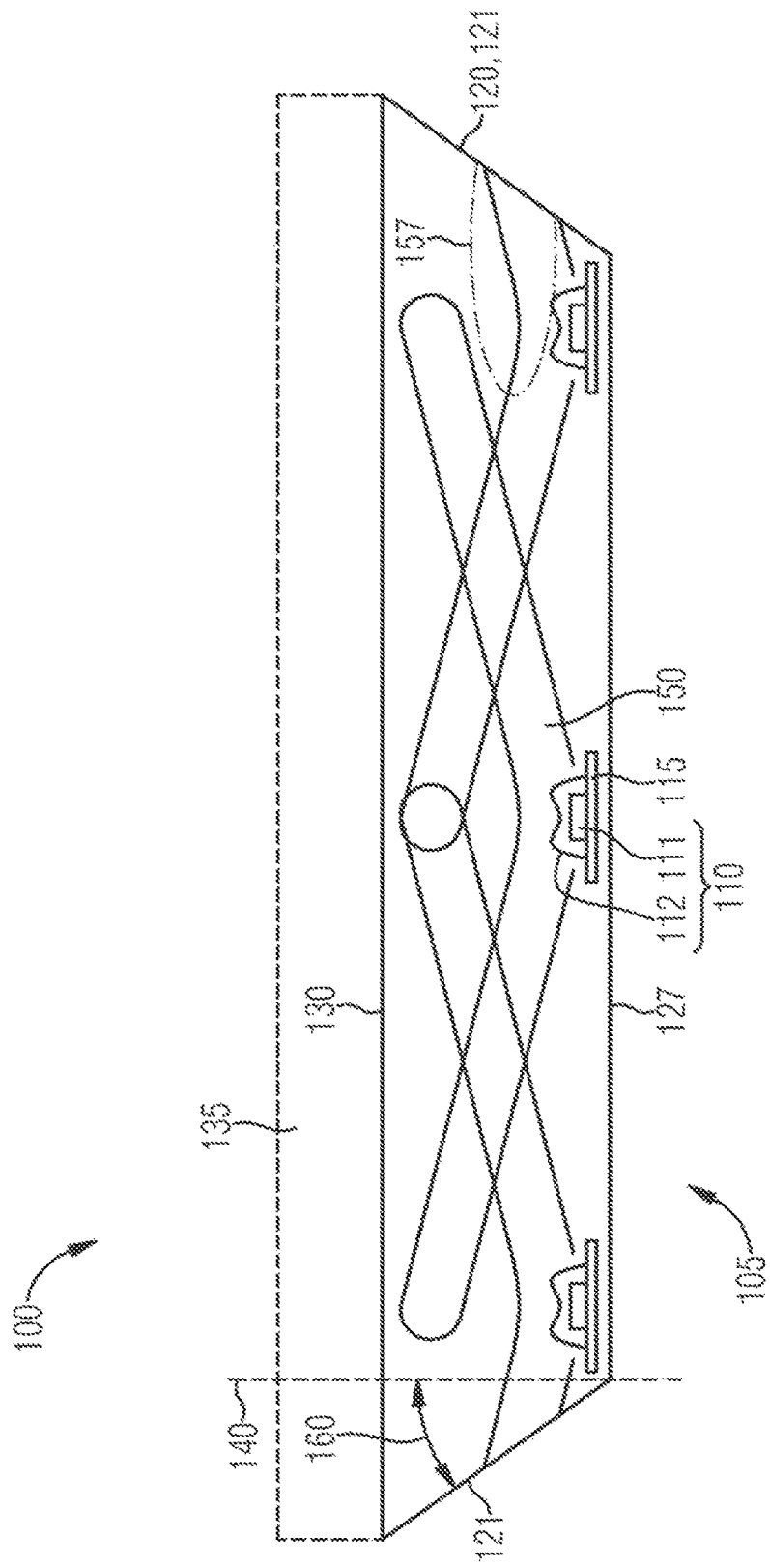
FIG. 1 shows a lateral illustration of an apparatus including a backlighting device and a further device, which can be illuminated with the aid of the backlighting device, wherein the backlighting device includes semiconductor light sources arranged in a plane and a frame extending around the semiconductor light sources and having angled and retroreflective side walls.

FIG. 1 shows a schematic lateral illustration of an apparatus 100 including a backlighting device 105, realized in the form of a direct backlight, and a further device 135. The backlighting device 105 is situated on the rear side of the device 135 and serves to irradiate the device 135 with a light radiation 150 as homogeneously as possible from the rear. A schematic plan view illustration of the backlighting device 105, with the aid of which further details will become clear, is supplementarily shown in FIG. 2.

The apparatus 100 is for example a flat screen or a flat screen television. In this configuration, the backlighting device 105 can be designed for generating white light radiation 150. The device 135 indicated schematically in FIG. 1 can be a liquid crystal screen or a liquid crystal display (LCD). In this case, the device 135 may include a customary construction having components (not illustrated) such as, for example, a front-side glass sheet, a rear-side glass sheet and, arranged between the glass sheets, liquid crystal cells with color filters.

The backlighting device 105 includes a plurality of semiconductor light sources 110 for generating and emitting the light radiation 150 used for illuminating the further device 135 on the rear side. The light sources 110 are arranged alongside one another in a plane. A matrix-shaped arrangement of the light sources 110 in the form of rows and columns is present here, as is shown in FIG. 2.

Figure 2:
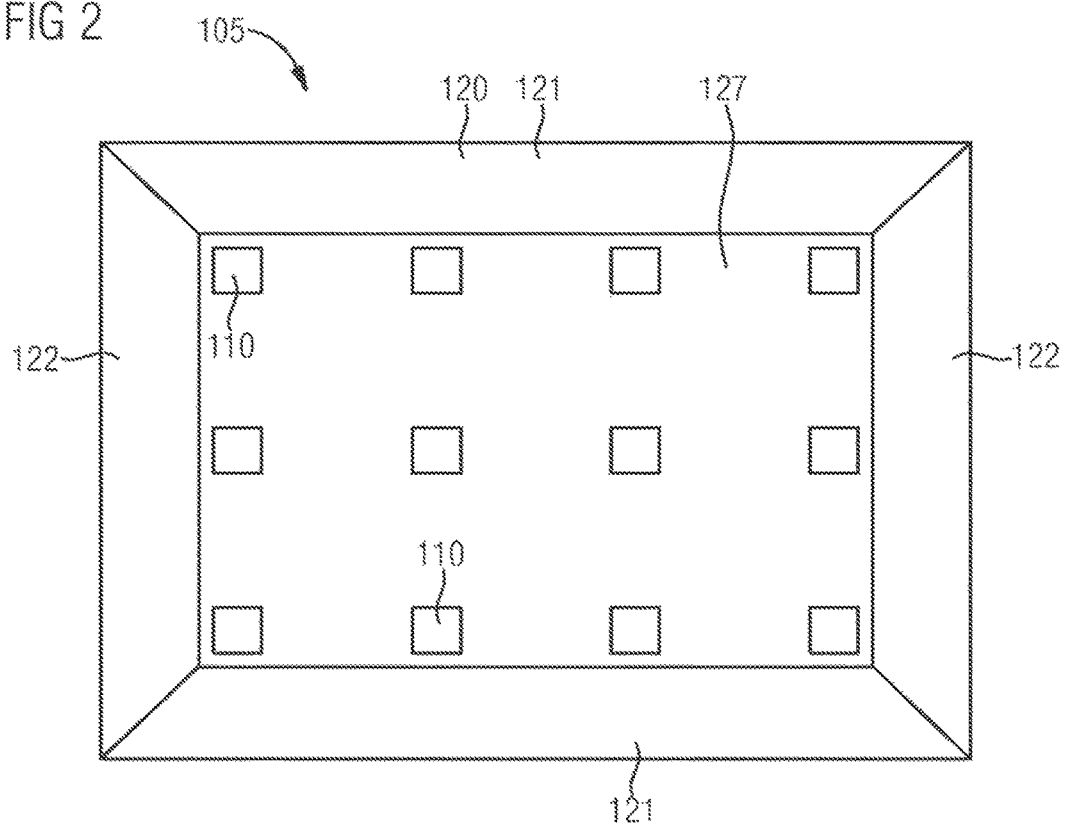
FIG. 2 shows a plan view illustration of the backlighting device.

It is pointed out that the configuration shown in FIG. 2 with an arrangement of 3×4 light sources 110 should be regarded merely as an example. In a departure therefrom, the backlighting device 105 can be realized with a different (for example smaller) number and/or different arrangement of the light sources 110.

The semiconductor light sources 110 of the backlighting unit 105 include radiation-emitting semiconductor components 111 and associated optical components 112, realized in the form of lenses, also designated hereinafter as primary optical units 112. These constituent parts 111, 112 are arranged on one or more carriers 115. Such a carrier 115 can be a circuit board or printed circuit board, for example.

A configuration having three separate carriers 115 is indicated in the lateral illustration in FIG. 1. In this context, it is possible, for example, for the backlighting device 105 to include three strip-shaped carriers 115 which extend horizontally with respect to the light source arrangement shown in FIG. 2 and are provided in each case with four light sources 110. In a departure therefrom, other configurations, including the use of an individual carrier 115 for all the light sources 110 of the backlighting device 105, are also conceivable. The light emitting semiconductor components 111 can be, in particular, light emitting diodes designed for generating white light radiation 150. For this purpose, the light emitting diodes 111 may include for example light emitting diode chips for generating a blue primary radiation and associated conversion elements for radiation conversion (not illustrated). The conversion elements can be designed to convert part of the blue light radiation into one or a plurality of secondary radiations in the green to red spectral range. A white mixed radiation 150 can be generated by means of a superimposition of these radiation proportions.

The primary optical units 112 assigned to the radiation-emitting components or light emitting diodes 111 serve to impart a predefined spread emission characteristic to the light sources 110. As is indicated in FIG. 1, in this case the light radiation 150 is emitted by the light sources 110 substantially toward the side and approximately horizontally. In this way, the radiation portions from the individual light sources 110 can be superimposed in such a way that a surface 130 illuminated by the backlighting device 105 experiences a homogeneous irradiation. The surface 130, which hereinafter is also designated as illumination surface or light exit surface, can be a rear side or rear surface of the further device 135 facing the backlighting device 105, or a part of the rear side of the device 135. In this case, the semiconductor light sources 110 arranged in a plane are arranged parallel to the illumination surface 130.

The backlighting device 105 furthermore includes a rear side 127 and a frame-shaped wall structure, designated as frame 120 hereinafter, which is associated therewith and marginally encloses the semiconductor light sources 110. The circumferentially extending frame 120 and the rear side 127 can form a housing of the backlighting device 105. The light sources 110 and/or the carrier(s) 115 can be arranged on the rear side 127.

The frame 120, which—as illustrated in FIG. 2—has a contour that is rectangular in plan view, has four side walls 121, 122 adjoining one another. In this case, the two mutually opposite side walls 121 have a greater length than the other two mutually opposite side walls 122.

The frame 120 extending circumferentially at the edge is designed to be angled in cross section, such that the side walls 121, 122 are inclined with respect to the plane predefined by the semiconductor light sources 110 or with respect to a normal 140 to said plane. On account of the parallel arrangement of the light sources 110 with respect to the illumination surface 130, the normal 140 can also relate to the illumination surface 130. FIG. 1 shows the inclined configuration for the two longer side walls 121. An inclination angle 160 relative to the normal 140 is indicated supplementarily on the left-hand side. The two shorter side walls 122 are likewise designed in an inclined fashion (cf. FIG. 2) and can have the same inclination as (or else a different inclination than) the other side walls 121. In this case, the side walls 121, 122 run obliquely outward in the direction of the illumination surface 130. On account of the oblique configuration of the side walls 121, 122 of the frame 120, the backlighting device 105 and thus the apparatus 100 have a flat appearance.

The frame 120 or the side walls 121, 122 thereof can have for example in cross section a length which extends from the rear side 127 as far as the illumination surface 130 and which amounts to between 10% and 95% of the distance between the light sources 110. It is also possible for the cross-sectional length to amount to, for example, between 3% and 30% of a lateral edge length of the device 135 or of a lateral edge length of the frame 120 in the region of the illumination surface 130.

In a departure from the illustration in FIG. 1, the inclination angle 160 of the side walls 121, 122 can be for example more than 45°. The inclination angle 160 can be for example in an angle range of between 45° and 80°. One possible example is an inclination angle 160 in the range of between 60° and 70°. A flat appearance can be fostered thereby.

During the operation of the backlighting device 105, the inclined side walls 121, 122 of the frame 120 extending laterally around the semiconductor light sources 110 are also irradiated with light radiation 150. This encompasses an irradiation of the side walls 121, 122 with light radiation 150 which is emitted by the light sources 110 adjacent to the side walls 121, 122 directly in the direction of the side walls 121, 122. In order to prevent a large portion of light radiation being reflected at the oblique side walls 121, 122 in the direction of the illumination surface 130 with the consequence of an increased luminance occurring at the edge of the illumination surface 130, and in order to ensure a homogeneous illumination of the entire surface 130, the side walls 121, 122 of the frame 120 are designed to be retroreflective at a side irradiated with the light radiation 150. In this case, the side walls 121, 122 of the frame 120 have a suitable retroreflective structure. Possible configurations are described further below with reference to FIGS. 4 to 9.

On account of the targeted retroreflective configuration of the side walls 121, 122, a large part of the incident light radiation 150 can be reflected back in the direction of the incident radiation 150 or in the direction of the light sources 110. FIG. 1 indicates such a retroreflective effect at the right-hand side wall 121 with the aid of an emission characteristic 157. In this case, the proportion of the light radiation 150 reflected back is significantly greater than in the case of an exclusively diffusively reflective surface.

In addition to the retroreflection, a desirable diffuse reflection furthermore takes place at the side walls 121, 122, such that part of the incident light radiation 150 is diffusely reflected at the side walls 121, 122. Consequently, part of the light radiation 150 is also emitted from the side walls 121, 122 in the direction of the illumination surface 130 or the edge of the illumination surface 130, such that the latter experiences a homogeneous illumination at the edge as well.

The diffuse reflection occurring at the retroreflective side walls 121, 122 is caused by effects such as, for example, scattering effects, a reflection at an (at least one) interface, structure defects, etc. Furthermore, a corresponding configuration for bringing about the additional diffuse reflection in a targeted manner can be provided, if appropriate, for the side walls 121, 122, as described in even greater detail further below.

In the backlighting device 105, regions between the semiconductor light sources 110 and also, if appropriate, at the edge or adjoining the retroreflective side walls 121, 122 can be designed to be diffusively reflective. The homogeneous irradiation of the illumination surface 130 can be fostered thereby. For this purpose, for example, a diffusively reflective or white layer or film can be used (not illustrated).

With regard to the side walls 121, 122 of the circumferentially extending frame 120, it is possible to achieve a homogeneous irradiation of the illumination surface 130 if the side walls 121, 122 are designed with the following reflection properties, described with reference to FIG. 3. In this case, a large part of the incident light radiation 150 impinges on the side wall 121 or 122 substantially at an angle 161 of incidence (or at angles of incidence in the region of the angle 161). The angle 161 of incidence is relative to a surface normal 141 predefined by the side wall 121, 122. The angle 161 of incidence can be in a range of between 20° and 70°, for example. This depends, inter alia, on the inclination of the side wall 121, 122. In this context, it is furthermore pointed out that, during the retroreflection, light radiation 150 cannot be completely reflected exactly in the direction of the incident light radiation 150, rather that the backreflection can take place in an angle range on account of structure defects, for example.

The side wall 121, 122 can be designed to the effect that more than 50% of the incident light radiation 150 is reflected back, that is to say is reflected in the direction of the incident light radiation 150, in an angle range beginning from an angle of more than 0° relative to the normal 141 or away from the normal 141. This angle range of the backreflection is indicated schematically on the basis of an angle 162 of reflection in FIG. 3. It is possible for the angle range to be greater than the range indicated on the basis of the angle 162 in FIG. 3, such that the angle 162 can exceed the angle 161, in a departure from FIG. 3. The side wall 121, 122 can be designed to the effect that more than 70% or more than 90% of the light radiation 150 is reflected back in the manner mentioned above. The homogeneous illumination can be fostered thereby.

Figure 3:
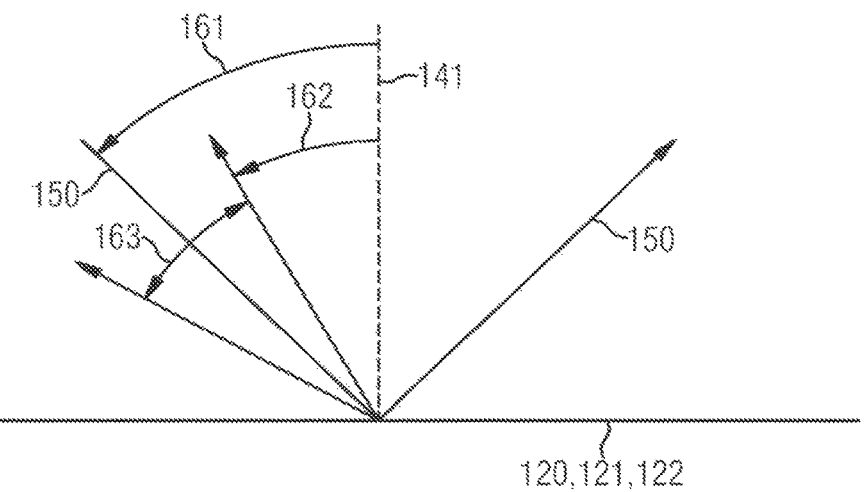
FIG. 3 shows an illustration of radiation reflections that occur at a retroreflective side wall.

The side wall 121, 122 can furthermore be designed to the effect that more than 50% of the incident light radiation 150 is reflected back in the direction of the incident light radiation 150 in a predefined angle range 163, as is likewise indicated in FIG. 3. In a departure from FIG. 3, the angle range 163 relative to the angle 161 of incidence can be between −45° and +45° or between −30° and +30°. In other words, the following conditions can be present:

angle of incidence −30°<angle of reflection<angle of incidence +30°, or angle of incidence −45°<angle of reflection<angle of incidence +45°.

The side wall 121, 122 can also be designed here to the effect that more than 70% or more than 90% of the incident light radiation 150 is reflected back in this way. This likewise fosters the provision of a homogeneous illumination.

The configurations mentioned above relate to the projection of the light paths into the plane of the drawing, as shown in FIG. 3, and thus to the reflection of radiation that occurs in the cross section of the side wall 121, 122. A spatial direction perpendicular thereto is not considered here. The side wall 121, 122 may or may not be retroreflective in said direction.

The retroreflective property of the side walls 121, 122 of the frame 120 of the backlighting device 105 can be realized by virtue of the side walls 121, 122 having a suitable retroreflective structure. Possible configurations of such structures, which can be provided in the region of that side of the side walls 121, 122 which can be irradiated with light radiation 150 of the light sources 110, are described in greater detail with reference to the following figures. Both two-dimensional and three-dimensional structures are conceivable here. In the case of a two-dimensional structure, the retroreflective effect can occur in a plane. Such a structure can have the same appearance or the same cross section in each case in a spatial direction perpendicular thereto. In the case of a three-dimensional structure, the retroreflective effect can occur not only in a plane or in two perpendicular spatial directions, but also with respect to a third spatial direction perpendicular thereto.

Figure 4:
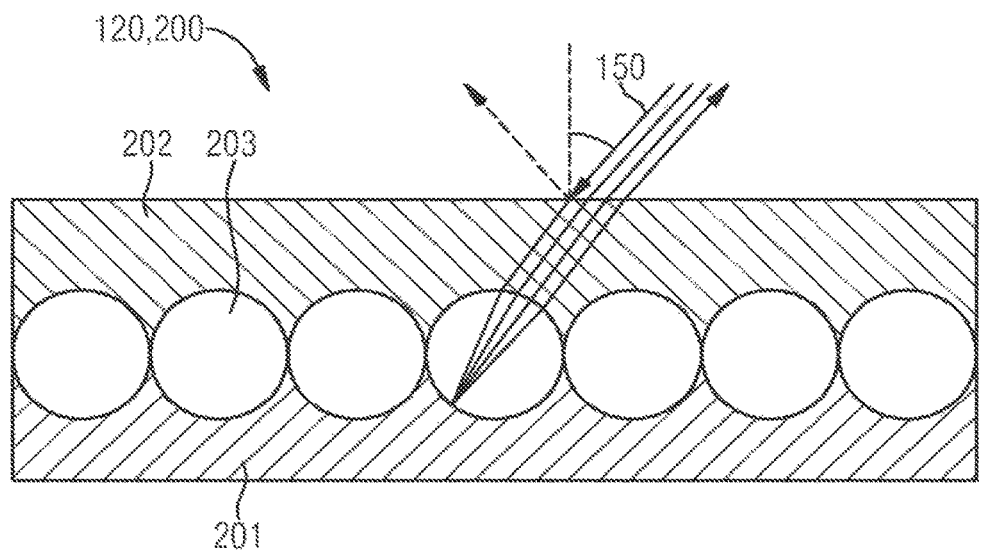
FIG. 4 shows a lateral illustration of a retroreflective structure for a side wall having a microsphere arrangement.
Figure 5:
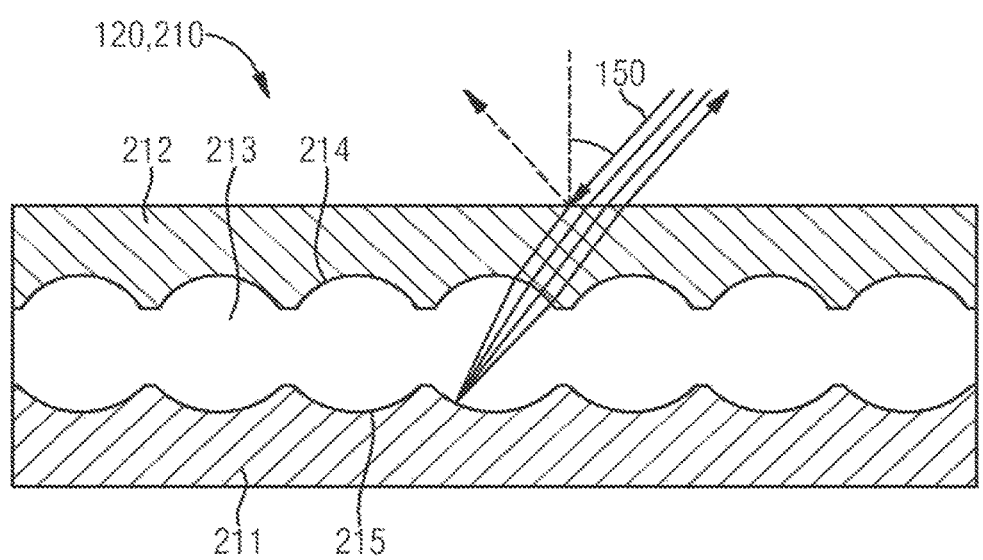
FIG. 5 shows a lateral illustration of a retroreflective structure for a side wall having a microlens arrangement.
Figure 6:
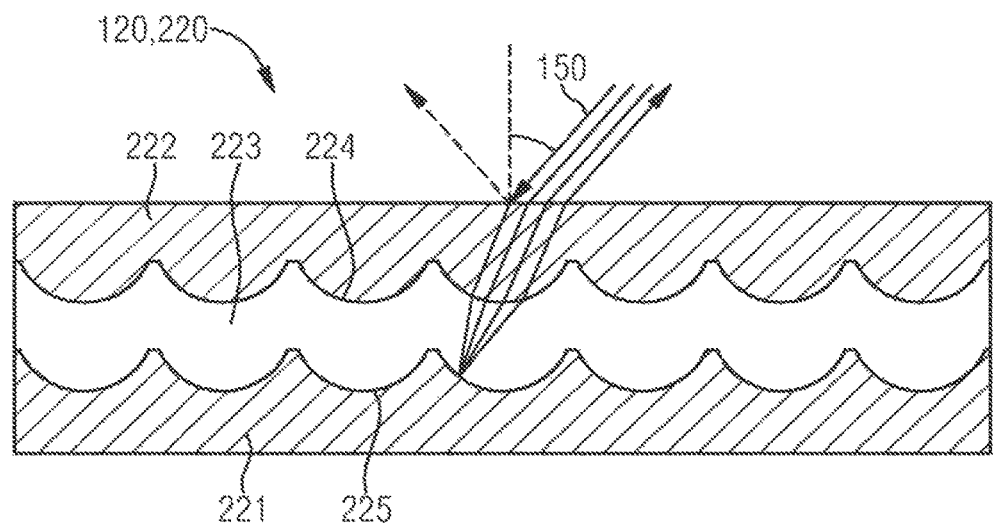
FIG. 6 shows a lateral illustration of a retroreflective structure for a side wall having a further microlens arrangement.

A retroreflection can be brought about with a lens and with a curved reflective surface. For this purpose, these components can be designed in such a way that a light radiation focused with the aid of the lens impinges on the curved reflective surface substantially perpendicularly and can thereby return after a reflection in the direction of the incident radiation. Configurations—functioning according to this principle—of retroreflective structures which can be provided in the frame 120 are shown in FIGS. 4 to 6. In the case of these structures, parameters such as, for example, refractive indices of materials, radii or radii of curvature and distances or focal lengths are coordinated with one another in such a way that the retroreflection can occur in the manner mentioned above.

FIG. 4 shows a retroreflective structure 200 having an arrangement of transparent microspheres 203 arranged in a manner distributed alongside one another in a plane. In this case, the front-side spherical surfaces of the microspheres 203 facing the incident light radiation 150 serve as lenses in order to focus the light radiation 150 in the direction of the rear-side spherical surfaces. This is illustrated on one microsphere 203 in FIG. 4. The light radiation 150 impinges on the rear-side spherical surfaces substantially perpendicularly and can return after a reflection in the direction of the incident light radiation 150. The rear-side spherical surfaces are designed to be reflective for this purpose. To that end, a layer 201 composed of a reflective metallic material is situated at the rear side of the microspheres 203 and adjoining the latter. At the front side, the microspheres 203 are embedded into a layer 202 composed of a transparent material having a lower refractive index in comparison with the microspheres. The layer 202 is designed in the form of a planarization layer having a planar front-side surface, at which the light radiation 150 is refracted.

FIG. 4 indicates with the aid of a dashed arrow that a reflection of radiation can also occur at the surface of the planarization layer. Reflections can also occur at other interfaces, in the present case between the layer 202 and the microspheres 203. Such reflections and also further influences such as, for example, scattering effects and structure defects are the cause of the diffuse reflection that occurs in addition to the retroreflection. This also applies to the configurations described below. In this context, it is furthermore pointed out that identical and identically acting components and structures are not described in detail again below, and that, instead, reference is made to the above description for details in respect thereof. Furthermore, features and details which are mentioned with regard to one configuration can also be applied to another configuration.

FIG. 5 shows a further retroreflective structure 210 having a transparent layer 213 having convexly curved partial surfaces 214 at a front side, facing the incident light radiation 150, and convexly curved partial surfaces 215 at a rear side. In this case, the partial surfaces 214, 215 can be partly spherically curved and can be arranged in a manner distributed in a plane. The partial surfaces 215 have a greater radius of curvature than the partial surfaces 214. The layer 213 forms, with the front-side curved partial surfaces 214, a microlens arrangement that can be used to focus the incident light radiation 150 in the direction of the rear-side partial surfaces 215. The light radiation 150 impinges on the partial surfaces 215 substantially perpendicularly and can return after a reflection in the direction of the incident light radiation 150. The partial surfaces 215 are designed to be reflective for this purpose. To that end, a layer 211 composed of a reflective metallic material is situated at the rear side of the layer 213 and adjoining the latter. On the front side of the layer 213 there is arranged a further layer 212 composed of a transparent material having a lower refractive index in comparison with the layer 213. The layer 212 is designed in the form of a planarization layer having a planar front-side surface, at which the light radiation 150 is refracted.

In accordance with FIG. 5, the lens layer 213 has a biconvex configuration having partial surfaces 214 and 215 curved outward on both sides. However, a configuration in the form of meniscus lenses is also possible.

A retroreflective structure 220 realized in this sense is shown in FIG. 6. The structure 220 has a transparent layer 223 having concavely curved partial surfaces 224 at a front side and convexly curved partial surfaces 225 at a rear side. In this case, the partial surfaces 224, 225 can be partly spherically curved and can be arranged in a manner distributed in a plane. The layer 223 forms, with the front-side curved partial surfaces 224, a microlens arrangement that can be used to focus the incident light radiation 150 in the direction of the rear-side partial surfaces 225. For this purpose, on the front side of the layer 223 there is arranged a further layer 222 composed of a transparent material having a higher refractive index in comparison with the layer 223. Said layer 222 is designed in the form of a planarization layer having a planar front-side surface. The focused light radiation 150 impinges on the rear-side curved partial surfaces 225 of the layer 223 substantially perpendicularly and can return after a reflection in the direction of the incident light radiation 150. For this purpose, the partial surfaces 225 are designed to be reflective, which is realized with the aid of a layer 221 composed of a reflective metallic material adjoining the layer 223 at the rear side.

Figure 7:
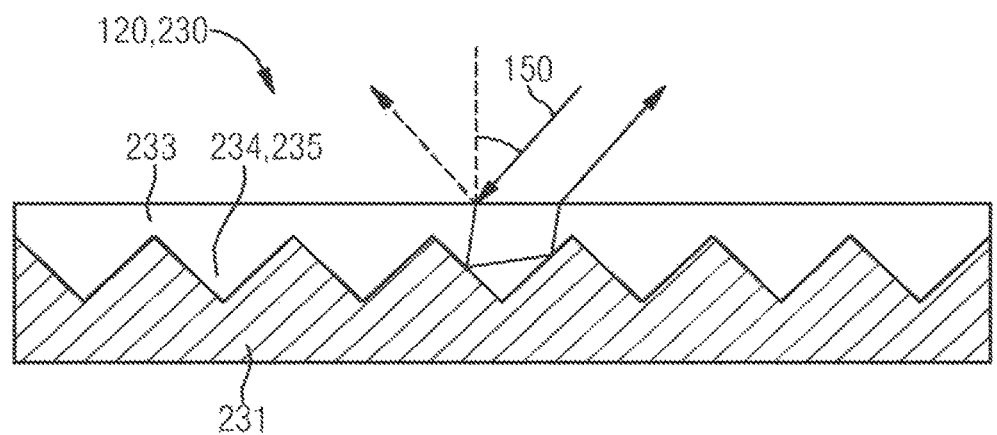
FIG. 7 shows a lateral illustration of a retroreflective structure for a side wall having a microprism arrangement or an arrangement of inverted cones.

FIG. 7 shows a further retroreflective structure 230 having an arrangement of corner or angle reflectors arranged alongside one another and having reflection surfaces oriented perpendicularly to one another. This is realized with the aid of a layer 231 which has a structured side facing the incident light radiation 150 and having cutouts 234 in the form of the corner reflectors and which is reflective at said side. The layer 231 can be formed from a reflective metallic material. Furthermore, on the structured side of the layer 231 there is arranged a layer 233 composed of a transparent material, which is designed in the form of a planarization layer having a planar front-side surface. The cutouts 234 are filled with material of the layer 233. This configuration can therefore form a microprism arrangement. In the case of the retroreflective structure 230, the incident light radiation 150, after a refraction at the front-side surface of the layer 233, can be reflected at the reflection surfaces of the cutouts 234 in such a way that the light radiation 150 (after a renewed refraction) can return in the direction of the incident radiation 150.

It is possible for the cutouts 234 to be designed in each case in a triangular fashion with only two perpendicularly oriented reflection surfaces. In this case, the structure shown can continue perpendicularly toward the plane of the drawing from FIG. 7, and grooved cutouts 234 extending in an elongate fashion perpendicularly to the plane of the drawing from FIG. 7 can thus be present.

Alternatively, the cutouts 234 can also have three reflection surfaces oriented perpendicularly to one another, and be designed in the form of inverted or upside down tetrahedra. In this case, the tetrahedral cutouts 234 can be arranged alongside one another in a manner distributed in a plane.

In a departure therefrom, further configurations can also be taken into consideration. By way of example, it is possible, in the case of the retroreflective structure 230 or at the structured side of the layer 231, to provide cutouts 235 in the form of inverted cones instead of cutouts 234 having reflection surfaces arranged perpendicularly to one another. Said cutouts in the form of inverted cones can appear like the cutouts 234 in cross section, and so FIG. 7 can be consulted correspondingly for such a configuration. The conical cutouts 235, filled with material of the layer 233, can be arranged alongside one another in a manner distributed in a plane. The conical cutouts 235 have an opening angle of 90° and, on account of the reflective layer 231, a reflective lateral surface. In this case, the incident light radiation 150 can be reflected on opposite sections of the lateral surface, such that a retroreflection occurs.

Figure 8:
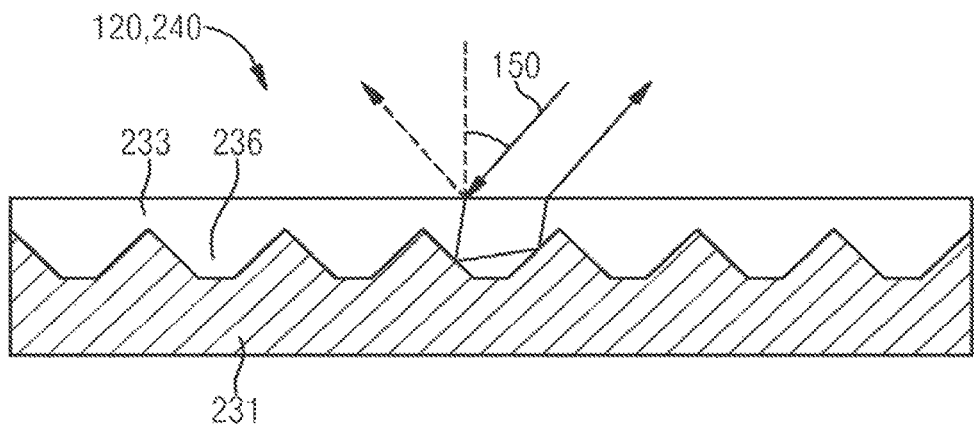
FIG. 8 shows a lateral illustration of a retroreflective structure for a side wall having an arrangement of inverted truncated cones.

By way of example, inverted truncated cones can also be used instead of cones. To that end, FIG. 8 shows a further retroreflective structure 240 having the same layers 231, 233 as the structure 230. The structured side of the layer 231 has cutouts 236 in the form of truncated cones. In this configuration, too, the incident light radiation 150 can be reflected on opposite sections of the lateral surface, such that a retroreflection takes place.

A retroreflective structure has an acceptance angle or acceptance angle range for which the structure is retroreflective. In the case of the backlighting device 105, the side walls 121, 122 of the frame 120 are designed in an inclined fashion, such that the light radiation 150 coming from (adjacent) semiconductor light sources 110 also impinges obliquely on the side walls 121, 122 and thus on the associated retroreflective structure (cf. FIG. 1). In order that no impairment of the retroreflective effect occurs as a result, the above-described retroreflective structures can be realized with structure elements which are designed such that they are tilted in the direction of the incident light radiation 150.

Figure 9:
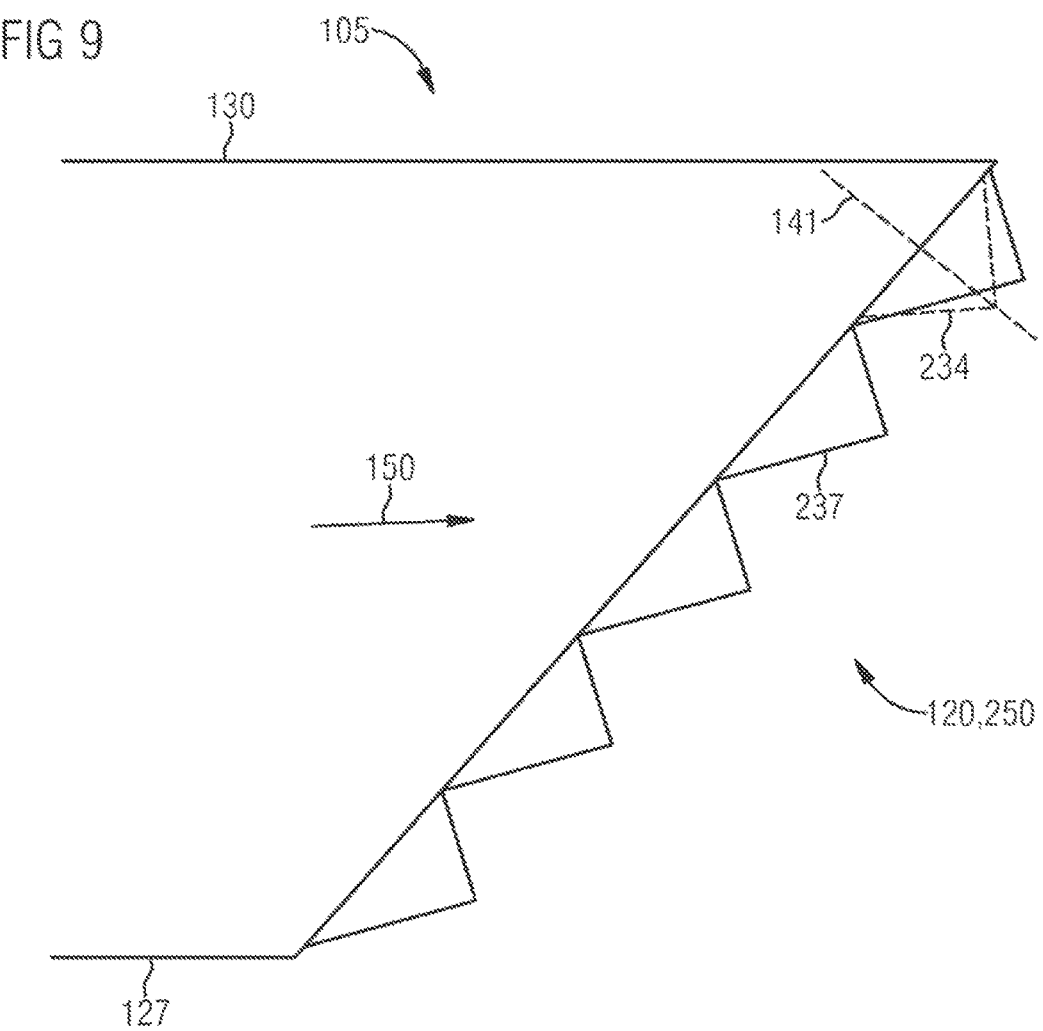
FIG. 9 shows a lateral illustration of an excerpt from the backlighting device in the region of a side wall which has a retroreflective structure having tilted structure elements.

In order to illustrate this approach, FIG. 9 shows a lateral illustration of an excerpt from the backlighting device 105 in the region of a side wall 121, 122 of the frame 120 with a retroreflective structure 250. The retroreflective structure 250 has cutouts 237. The cutouts 237 can have reflection surfaces oriented perpendicularly to one another, for example, or serve as corner reflectors. In this case, a configuration comparable to FIG. 7 with the layers 231, 233 can be present, that is to say that the cutouts 237 are formed at that side of the reflective layer 231 which faces the incident light radiation 150. The cutouts 237 are designed such that they are tilted, with respect to the surface normal 141 predefined by the side wall 121, 122 of the frame 120, in the direction of the incident light radiation 150. In this way, a tilted prism arrangement is present. The tilted configuration becomes clear from a comparison of the cutouts 237 with a cutout 234 indicated with the aid of dashed lines in FIG. 9. The cutout 234 does not have such a tilted embodiment, but instead has a customary orientation symmetrical with respect to the orientation of the normal 141.

Such a tilted configuration can also be employed for other retroreflective structures having other structure elements.

These include, for example, the above-described structures having conical or frustoconical cutouts 235, 236.

The configurations of retroreflective structures described with reference to FIGS. 4 to 9 can be realized for example in the form of retroreflective films or adhesive films. In this case, the side walls 121, 122 can be realized in the form of side walls 121, 122 provided with the adhesive film (not illustrated). In this sense, the structures illustrated in FIGS. 4 to 9 can have at least one further layer (not shown) such as an adhesive layer, for example.

Furthermore, the structures in FIGS. 4 to 9 can be modified in such a way that a reflective material or a reflective configuration is present only in the region of the reflective surfaces of interest (rear-side spherical surfaces of the microspheres 203, rear-side curved partial surfaces 215, 225 of the lens layers 213, 223, reflection surfaces of the cutouts 234, 235, 236, 237). In this case, the layers 201, 211, 221, 231 can be carrier layers having a reflective coating on the front side (not illustrated). The reflective coating can for example be formed from a metallic material or be realized in the form of a Bragg mirror.

As was indicated above, if appropriate a configuration for bringing about the additional diffuse reflection in a targeted manner can be taken into account for the retroreflective side walls 121, 122 of the frame 120. With regard to the structures in FIGS. 4 to 9, this can be done for example by designing the layers 202, 212, 222, 233 with a roughened front-side surface for bringing about scattering (not illustrated). A further variant is the use of scattering particles which can be embedded for example in the transparent material of the layers 202, 212, 222, 233 (not illustrated).

The embodiments explained with reference to the figures constitute preferred or exemplary embodiments of the present disclosure. Besides the embodiments shown and described, further embodiments are conceivable which can encompass further modifications and/or combinations of features.

By way of example, the configurations explained are not restricted to an apparatus 100 in the form of a flat screen or a flat screen television. The apparatus 100 including the backlighting device 105 can for example also be a self-luminous road sign, an advertisement, a self-luminous poster or a surface light source for room lighting. Accordingly, configurations deviating from a liquid crystal display can also be taken into consideration for the further device 135 of the apparatus 100, which is illuminated from the rear. The device 135 can be for example a transparent layer, if appropriate colored differently in different regions, or a diffuser plate or may include such components.

With regard to the backlighting device, one possible modification (not shown) consists in designing it with a rectangular frame, not all four side walls of which are oriented in an inclined manner with respect to the plane of the light sources or with respect to the illumination surface. By way of example, it is possible for only two mutually opposite side walls or only one side wall to be inclined, whereas the other side walls are oriented perpendicularly to the plane predefined by the light sources or perpendicularly to the illumination surface. In the case of such configurations, the inclined side wall or the inclined side walls can be designed to be retroreflective in accordance with the above approaches. The orthogonal side walls can be designed to be specularly reflective at the side which can be irradiated with light radiation of the light sources.

In a similar manner it is possible to realize a backlighting device which includes a frame extending around a plurality of semiconductor light sources and having a different contour in plan view, for example a triangular contour having three side walls. In this case, at least one or a plurality or else all of the side walls can be oriented in an inclined manner with respect to the plane of the light sources or with respect to the illumination surface and can be designed to be retroreflective. A perpendicular side wall (if present) can be designed to be specularly reflective.

In a further possible modification, the backlighting device may include an inclined and retroreflective side wall which has a curved contour instead of a straight contour in plan view.

In a further possible modification, the backlighting device may include an inclined and retroreflective side wall which has a closed contour in the form of a circle or oval extending around the light sources.

Depending on the contour of the backlighting device, a further device illuminated thereby from the rear can also have a corresponding contour.

In a further possible modification, the light sources of the backlighting device can be designed for generating a light radiation having a different color than white.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A backlighting device, comprising:
   a plurality of semiconductor light sources arranged in a plane and serving for generating light radiation; and
   at least one side wall arranged laterally with respect to the semiconductor light sources, where the side wall is inclined with respect to the plane predefined by the semiconductor light sources, and wherein the at least one side wall is retroreflective at a side which can be irradiated with light radiation of the semiconductor light sources;
   wherein the at least one retroreflective side wall is designed to reflect back more than 50% of an incident light radiation in a predefined angle range in the direction of the incident light radiation.

2. The backlighting device as claimed in claim 1,
   wherein the inclined and retroreflective side wall is part of a frame extending around the semiconductor light sources, and wherein the frame has further side walls.

3. The backlighting device as claimed in claim 2,
   wherein the frame is rectangular.

4. The backlighting device as claimed in claim 2,
   wherein at least one of the further side walls of the frame is inclined and retroreflective.

5. The backlighting device as claimed in claim 1,
   wherein the at least one retroreflective side wall is designed to reflect back the incident light radiation in an angle range beginning from an angle of more than 0° relative to a normal predefined by the at least one retroreflective side wall.

6. The backlighting device as claimed in claim 1,
   wherein the at least one retroreflective side wall has a retroreflective structure, and
   wherein the retroreflective structure comprises at least one of the following:

an arrangement of microspheres; a microlens arrangement; an arrangement of corner reflectors; an arrangement of inverted cones; an arrangement of inverted truncated cones.

7. The backlighting device as claimed in claim 1,
wherein the at least one retroreflective side wall has a retroreflective structure, and
wherein structure elements of the retroreflective structure are tilted with respect to a normal predefined by the at least one retroreflective side wall.

8. The backlighting device as claimed in claim 7, wherein the structure elements of the retroreflective structure are tilted in the direction of the incident light radiation.

9. The backlighting device as claimed in claim 1,
wherein the semiconductor light sources have an optical unit.

10. The backlighting device as claimed in claim 9,
wherein the optical unit is a lens.

11. The backlighting device as claimed in claim 1,
wherein the semiconductor light sources have a spread emission characteristic with a light emission taking place toward the side.

12. The backlighting device as claimed in claim 1, comprising an illumination surface, wherein the plane predefined by the semiconductor light sources is arranged in parallel to the illumination surface.

13. The backlighting device as claimed in claim 1, wherein the at least one retroreflective side wall is adapted to diffusely reflect a part of the incident light radiation.

14. The backlighting device as claimed in claim 1,
wherein the at least one retroreflective side wall has a retroreflective structure,
wherein the retroreflective structure comprises a transparent layer having partial curved surfaces at a front side and having partial curved surfaces at a rear side of the transparent layer.

15. The backlighting device as claimed in claim 14,
wherein the transparent layer has a biconvex configuration, wherein the front side and the rear side of the transparent layer are each curved outward.

16. The backlighting device as claimed in claim 14,
wherein the transparent layer has a concavely curved partial surface on the front side and a convexly curved partial surface on the rear side.

17. The backlighting device as claimed in claim 1,
wherein the at least one retroreflective side wall is designed to reflect back a large part of the incident light radiation in the predefined angle range in the direction of the incident light radiation.

18. An apparatus, comprising a backlighting device and a further device, which can be irradiated with light radiation of the backlighting device
the backlighting device comprising:
a plurality of semiconductor light sources arranged in a plane and serving for generating light radiation; and
at least one side wall arranged laterally with respect to the semiconductor light sources, where the side wall is inclined with respect to the plane predefined by the semiconductor light sources, and wherein the side wall is retroreflective at a side which can be irradiated with light radiation of the semiconductor light sources;
wherein the at least one retroreflective side wall is designed to reflect back more than 50% of an incident light radiation in a predefined angle range in the direction of the incident light radiation.

19. A backlighting device, comprising:
an illumination surface,
a plurality of semiconductor light sources arranged in a plane and serving for generating light radiation, wherein the plane predefined by the semiconductor light sources is arranged in parallel with respect to the illumination surface; and
at least one side wall arranged laterally with respect to the semiconductor light sources, wherein the side wall is inclined with respect to the plane predefined by the semiconductor light sources and is inclined with respect to the illumination surface, and wherein the side wall is retroreflective at a side which can be irradiated with light radiation of the semiconductor light sources;
wherein the at least one retroreflective side wall is designed to reflect back more than 50% of an incident light radiation in a predefined angle range in the direction of the incident light radiation.

20. The backlighting device as claimed in claim 19,
wherein part of the incident light radiation is additionally diffusively reflected at the at least one retroreflective side wall.

* * * * *